United States Patent Office 3,395,804
Patented Aug. 6, 1968

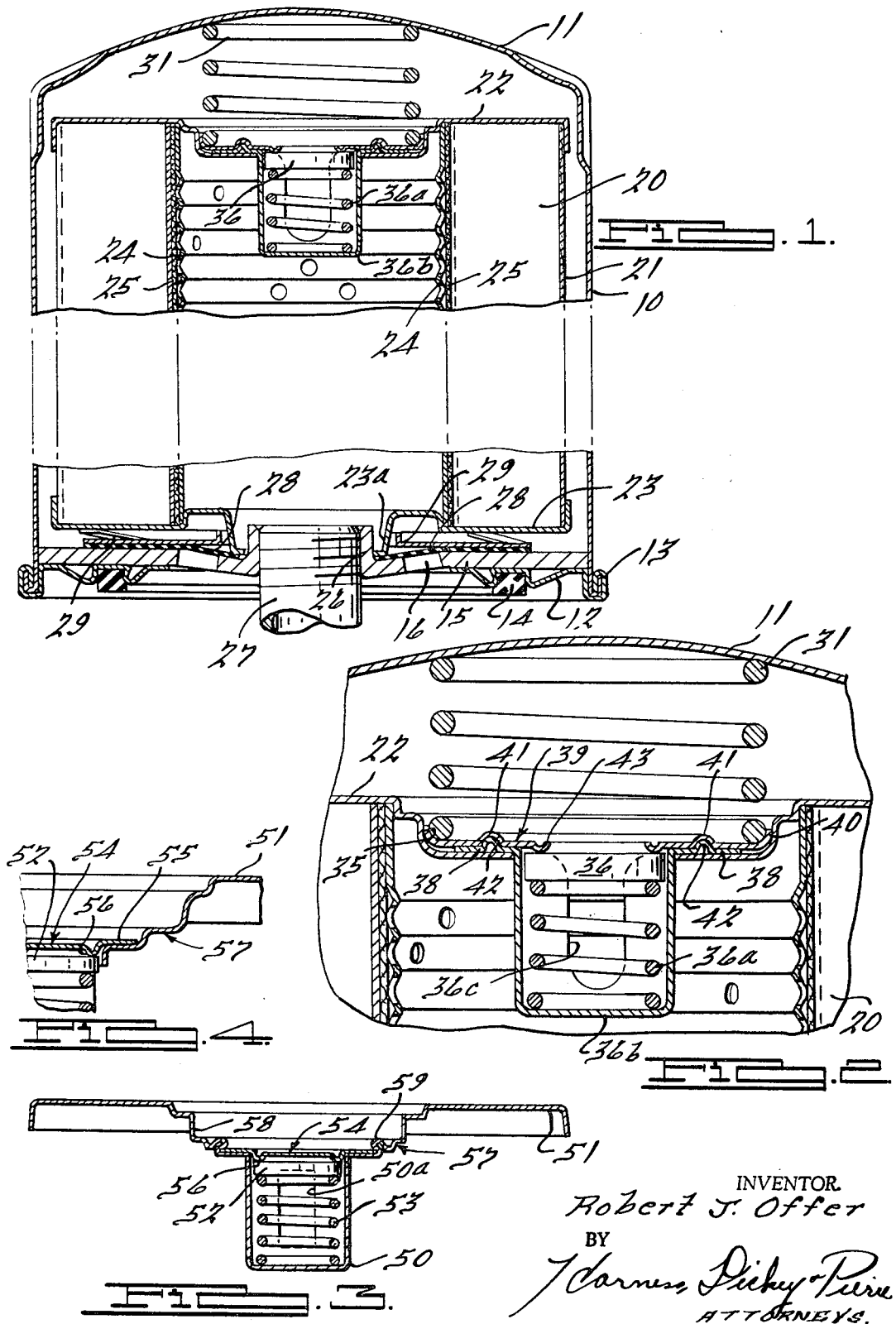

3,395,804
FILTER ASSEMBLY RELIEF VALVES
Robert J. Offer, Racine, Wis., assignor to Walker Manufacturing Company, Racine, Wis., a corporation of Delaware
Filed Dec. 30, 1964, Ser. No. 422,383
2 Claims. (Cl. 210—130)

ABSTRACT OF THE DISCLOSURE

Two filter element relief valves, one valve having the valve cage formed integrally from the filter end cap and having the valve seat member secured between folded over portions of said end cap; the other valve having a separate valve cage inserted into a central opening in a filter end cap, and seating thereon, and secured thereon by a valve seat member which is frictionally secured to said end cap.

---

This invention relates to oil filters and, more particularly, to the pressure relief valve forming a part of such filters.

One of the objects of this invention is to provide a valve construction which is formed of inexpensive stampings and which may be assembled without the use of spot welds and the consequential welding equipment.

Another object of this invention is to provide a pressure relief valve of this type in which the valve parts are inserted from the top of the end cap away from the filter element so that none of the parts may accidentally get into the engine through the filter element.

If the valve parts are secured together by spot welds, the failure of a weld might permit one of the parts to fall into the filter element and thence into the engine. Also, if metallic valve members are employed, the welding operations normally employed would tend to weld the valve member in closed position or to the assembly, so that the valve would not operate. These and other benefits are attained by the use of the present invention.

In accordance with this invention, the pressure relief valve is secured to and carried by the filter element end cap. This end cap is provided with a recess or pocket and a retainer cup provided with a valve seat is forced into said recess or pocket. Prior to the assembly of the retainer cup and valve seat with the recess, a valve housing containing a spring and valve disk is associated with the recess and is held in assembled relation therewith by the retainer cup. Thus, all parts of the valve are held in assembled relation without the use of spot welds or the like.

In a modification of the invention, the valve housing is shown as formed as a stamping integrally with the end cap. This valve housing carries a spring and a valve disk. The valve seat is located in a recess formed in the end cap and is held in place by staking over a portion of the wall of the recess so that the parts are held in assembled relation without the use of spot welds or the. like.

In the construction shown in the drawings, a formed metal cup can be used instead of a valve disk, the cup being provided with a skirt which engages the valve housing to prevent the valve member from cocking or becoming askew.

An important object of this invention is to provide a pressure relief valve which is so reduced in the number and character of its component parts as to approach the ultimate in structural simplicity and wherein its structural simplicity creates an economy in its manufacture, installation and maintenance costs.

The various objects and advantages, and the novel details of construction of two commercially practical embodiments of the invention, will become more apparent as this description proceeds, especially when considered in connection with the accompanying drawings, in which:

FIGURE 1 is a fragmentary vertical sectional elevational view of a filter embodying this invention;

FIGURE 2 is an enlarged sectional view of the pressure relief valve;

FIGURE 3 is a sectional elevational view of a modified form of pressure relief valve wherein the valve case is an integral part of the end cap; and FIGURE 4 is a fragmentary sectional view of the structure shown in FIGURE 3 before the staking operation.

By referring to FIGURE 1, one environment, such as an oil filter, will be described with respect to which the pressure relief valve of this invention may be used to particular advantage.

In FIGURE 1, the reference character 10 indicates a casing, usually cylindrical, which has a closed top 11 and a bottom closure plate 12 locked in place by a rolled seam 13. The closure plate 12 carries a seal 14 adapted to engage a fixed part of the engine block (not shown). Arranged across the bottom of the casing is a base plate 15 provided with inlet ports 16 adapted to receive oil from the engine block.

Arranged within the housing or casing 10 is a filter element 20 contained within a perforated filter element shell 21, the upper and lower ends of which are closed by end or cap plates 22 and 23. Arranged centrally of the filter element is a perforated center tube 24 covered by a fabric 25.

The base plate 15 is provided with a threaded member or flange 26 adapted to threadedly engage a pipe 27 connected to the lubricating system (not shown) of a vehicle engine or the like, and constitutes the outlet port of the filter. Secured immediately above the base plate 15 is an antidrain-back valve 28, preferably in the form of a rubber disk. This valve is normally urged to closed position by a circular leaf-like spring member 29 which engages the valve and the lower cap plate 23. The inner periphery of the rubber valve disk member 28 is shown as held in position by a portion 23a of the lower cap plate 23.

Ordinarily, the filter is provided with a holddown spring 31 which is compressed when the filter is assembled to hold the parts in the position illustrated in FIGURE 1 to thereby prevent rattling and dislocation thereof.

In the foregoing, there has been described a type of filter constituting the environment in which the pressure relief valve of this invention may be used to advantage, but this construction has not been described in more detail, because it forms no particular part of the present invention.

In accordance with the present invention, the upper end cap 22, see FIGURES 1 and 2, is provided with a dish-shaped recess 35. It will be understood that this may be easily provided, because the end cap 22 and all of its parts may be cheaply and easily formed by a stamping operation. The recess 35 is formed on the side of the end cap 22 which is remote or away from the filter element. Thus, the parts yet to be referred to of the relief valve may be inserted from the top of the end cap away from the filter element, so that none of these parts may accidentally get into the engine through the center tube 24 of the filter.

The reference character 36b designates a valve housing containing a valve member 36 and a spring 36a adapted to normally bias the valve member 36 into closed position. The valve housing is provided with a plurality of slots or openings 36c extending therethrough. These valve parts are first inserted in the valve housing 36b, which is then engaged with the bottom of the recess 35 by means of laterally extending lugs or ears 38.

The parts just described are assembled with the bottom of the recess 35 and are all held in position by a valve seat member 39 which is provided with an annular flange or edge portion 40 which is normally flared slightly outwardly and thus must be forcibly engaged in the recess 35 to hold these parts together. The valve seat member 39 may be provided with rib-like indentations 41 which engage similar ribs 42 on the ears or lugs 38 to assist in positioning and holding the valve housing 36b in place. The valve seat member 39 is provided with an annular valve seat 43 in the form of a rib which may be conveniently stamped in the valve seat member. This rib 43 forms a seat for the valve member 36 in its closed position.

The frictional engagement of the annular flange or edge portion 40 with the recess 35 holds all of the parts in assembled relation without the use of spot welds or the like. The parts heretofore described may be economically manufactured from stampings, so that the cost of the device together with the manner of assembling is inexpense and simple.

It will be noted that all of the parts are inserted from the top of the filter element so that none of the parts may accidentally get into the engine through the filter element.

The pressure relief valve of this invention operates in the same manner as other pressure relief valves for oil filters, so that when the filter element becomes clogged or the oil is particularly viscous, the oil may bypass the filter element and flow through the bypass valve by displacing the valve member 36 against the action of its spring 36a. The oil may, thereupon, flow out the outlet of the filter.

As a consequence of the construction just described, it will be noted that the holddown spring 31 may engage the top 11 of the casing on the one hand, and the top of the valve seat member 39 on the other hand. This will serve to prevent any accidental disengagement of the valve seat member 39 with the recess 35. Also, if desired, the engagement of the spring 31 with the valve member 39 may serve as the sole means for holding the valve seat member 39 in place.

From the foregoing, it will be noted that the construction just described is totally devoid of welds to secure the parts together and thus metallic valve members 36 may be used which otherwise might become welded to the assembly and thus become inoperative if conventional welding equipment was employed.

In FIGURES 3 and 4, a slightly modified form of construction is illustrated in which the valve housing 50 is stamped and drawn from the metal of the top end cap 51 and thus forms an integral part thereof. The housing 50 is provided with a plurality of slots or openings 50a therethrough. Contained within the valve housing 50 is a valve member 52 and a spring 53 normally urging the valve member 52 into closed position. In this form of construction, the reference character 54 indicates a valve seat member which is seated in a recess 55 in the end cap 51. The valve member 52 is adapted to seat on an annular rib-like portion 56 formed on the valve seat member 54. The valve seat member 54 is secured in assembled relation, without the use of welds, by staking over the portions 57 of the recess 58 in the end cap 51. The shape of the end cap before the staking operation is illustrated in FIGURE 4 and the shape of the end cap after being staked over is shown in FIGURE 3. The staking operation forms a bead 59 which engages the periphery of the valve seat member 54, as illustrated in FIGURE 3. Thus, in this form of construction also, the parts may be united in assembled relation without the use of welds.

It will thus be seen that in both constructions, the valve members 36 and 52 may be formed of metal because there is no danger of these valves becoming welded to the adjacent structure, inasmuch as no welds are employed in connecting the parts in either form of the invention.

Also, it should be noted that in both forms of the invention, the parts of the valve assembly are inserted from the top and therefore the point most remote from the interior of the filter element, so that none of the parts of the valve may accidentally get into the engine through the filter element.

Also, in each form of the invention, all of the parts may be quickly, easily and economically produced by an inexpensive stamping. Also, the number of parts are reduced to a minimum. Thus, this invention provides a pressure relief valve which is so reduced in the number and character of its component parts as to approach the ultimate in structural simplicity, whereby an economy in its manufacture, installation and maintenance costs is attained.

While two commercially practical embodiments of the invention have been described and illustrated herein somewhat in detail, it will be understood that various changes may be made as may come within the purview of the accompanying claims.

What is claimed is:

1. A filter comprising an annular filter media, an end cap having one side thereof affixed to one end of said filter media in sealing relation therewith, said end cap having a portion extending radially inwardly of the central opening of said annular filter media and defining a flow opening at one end of said filter media, said portion being depressed axially inwardly of the central opening of said filter media and being defined by an upstanding portion and a generally radially extending portion in which said flow opening is formed, a valve cage having a portion depending through said flow opening of said end cap and depending into said central opening of said filter media, said valve cage having an outwardly extending portion extending across said end cap portion, said valve cage portion having one side thereof in abutting relationship with the other side of said end cap adjacent said flow opening for supporting said valve cage upon said end cap, a valve member supported within said valve cage for movement between an opened and a closed position, biasing means supported within said valve cage and engaging said valve member for urging said valve member to its closed position, a valve seat member engaging at least a portion of the other side of said outwardly extending portion of said valve cage, said valve seat member having an upstanding portion frictionally engaged with said upstanding portion of said end cap for affixing said valve seat member relative to said end cap portion and for maintaining said valve seat member and said valve cage in assembled relationship to said end cap, said valve seat member extending inwardly of said flow opening in said end cap portion and defining an opening surrounded by a valve seat, said valve member being adapted to engage said valve seat when said valve member is in its closed position for precluding fluid flow through said opening in said valve seat member.

2. A filter element comprising an annular filter media defining a central opening, an end cap having a first portion sealingly engaged with one end of said filter media, a second portion extending across said central opening and defining a flow opening in registry therewith and a third integral valve cage portion depending into said central opening, a valve member supported within said valve cage portion and supported for movement therein between an opened position and a closed position, biasing means supported within said valve cage portion and engaging said valve member for urging said valve member to its closed position, and a valve seat member in engagement with the portion of said end cap that extends across said central opening, said valve seat member having a valve seat portion defining a flow opening in registry with the flow opening of said end cap, the flow opening of said valve seat member being smaller in area than the flow opening of said end cap, said valve member being adapted to engage said valve seat of said valve seat member when in its closed position for precluding fluid flow through the flow opening of said valve seat member, the portion of said end cap extending across said filter media central opening having parts engaged with opposite sides of the outer terminus of said valve seat member for affixing said valve seat member relative to said end cap.

References Cited

UNITED STATES PATENTS

| | | | |
|---|---|---|---|
| 2,884,133 | 4/1959 | Walulik et al. | 210—130 X |
| 3,061,101 | 10/1962 | Humbert | 210—130 |
| 3,132,097 | 5/1964 | Tietz | 210—130 |
| 3,146,194 | 8/1964 | Hathaway | 210—130 |
| 3,187,896 | 6/1965 | Wilkinson | 210—130 |
| 3,268,077 | 8/1966 | Ball | 210—136 X |

FOREIGN PATENTS

| | | |
|---|---|---|
| 1,357,474 | 2/1964 | France. |
| 921,116 | 3/1963 | Great Britain. |
| 950,810 | 2/1964 | Great Britain. |
| 672,333 | 3/1939 | Germany. |

REUBEN FRIEDMAN, *Primary Examiner.*

F. SPEAR, *Assistant Examiner.*